United States Patent
Stebnicki

[11] Patent Number: 6,161,685
[45] Date of Patent: Dec. 19, 2000

[54] THERMOPLASTIC CHAIN LINK FOR A MODULAR CONVEYOR CHAIN

[75] Inventor: James C. Stebnicki, Whitefish Bay, Wis.

[73] Assignee: Rexnord Corporation, Milwaukee, Wis.

[21] Appl. No.: 09/277,297

[22] Filed: Mar. 26, 1999

[51] Int. Cl.$^7$ .......................... B65G 17/06; B65G 17/38
[52] U.S. Cl. ........................................... 198/851; 198/852
[58] Field of Search ................................. 474/207; 198/851, 198/852, 853

[56] References Cited

U.S. PATENT DOCUMENTS

| | | | |
|---|---|---|---|
| 3,586,393 | 6/1971 | Myers | 305/35 R |
| 3,921,792 | 11/1975 | Anderson et al. | 474/207 |
| 4,167,999 | 9/1979 | Haggerty | 198/851 |
| 4,266,661 | 5/1981 | Andersson | 198/822 |
| 4,383,818 | 5/1983 | Swannell | 425/546 |
| 4,490,970 | 1/1985 | Curl | 59/79.1 |
| 4,573,567 | 3/1986 | Swinderman | 198/860 |
| 4,698,504 | 10/1987 | Van Pelt | 250/319 |
| 4,711,346 | 12/1987 | Breher et al. | 198/844 |
| 4,821,872 | 4/1989 | Lapeyre | 198/853 |
| 4,852,718 | 8/1989 | Kunstmann | 198/465.3 |
| 4,886,156 | 12/1989 | Records et al. | 198/692 |
| 4,893,709 | 1/1990 | Schroeder et al. | 198/852 |
| 4,925,013 | 5/1990 | Lapeyre | 198/698 |
| 4,953,693 | 9/1990 | Draebel | 198/853 |
| 4,993,544 | 2/1991 | Bailey et al. | 198/834 |
| 5,096,053 | 3/1992 | Hodlewsky | 198/853 |
| 5,121,831 | 6/1992 | Fesler | 198/853 |
| 5,125,504 | 6/1992 | Corlett et al. | 198/853 X |
| 5,137,144 | 8/1992 | Uehara | 198/822 |
| 5,199,551 | 4/1993 | Wallaart et al. | 198/852 X |
| 5,217,110 | 6/1993 | Spangler et al. | 198/852 |
| 5,335,768 | 8/1994 | Schladweiler | 198/853 |
| 5,402,880 | 4/1995 | Murphy | 198/852 |
| 5,439,097 | 8/1995 | Takahashi et al. | 198/803.01 |
| 5,469,958 | 11/1995 | Gruettner et al. | 198/834 |
| 5,497,874 | 3/1996 | Layne | 198/698 |
| 5,507,383 | 4/1996 | Lapeyre et al. | 198/853 |
| 5,538,384 | 7/1996 | Haldimann | 414/286 |
| 5,575,937 | 11/1996 | Haase | 249/119 |
| 5,586,644 | 12/1996 | Coen et al. | 198/853 |
| 6,079,552 | 6/2000 | Reichert et al. | 198/852 |

*Primary Examiner*—Christopher P. Ellis
*Assistant Examiner*—Gene O. Crawford
*Attorney, Agent, or Firm*—Quarles & Brady LLP

[57] ABSTRACT

The present invention is an improved modular chain link used for constructing a modular conveyor chain. The chain link includes a plastic body having a plurality of spaced link ends which are adapted to intermesh with complementary link ends projecting from a link or links in an adjacent row. The link ends include axially aligned openings that are adapted to receive a connecting pin. The connecting pin extends through the openings in the link ends of the intermeshing links and fastens the adjacent links together such that the links can pivot with respect to each other. The improved modular chain link further includes a support member that is molded within the plastic body of the chain link. The support member increases the strength of the modular chain link and minimizes the thermal expansion and contraction that occurs when the chain link is subjected to a temperature change.

11 Claims, 3 Drawing Sheets

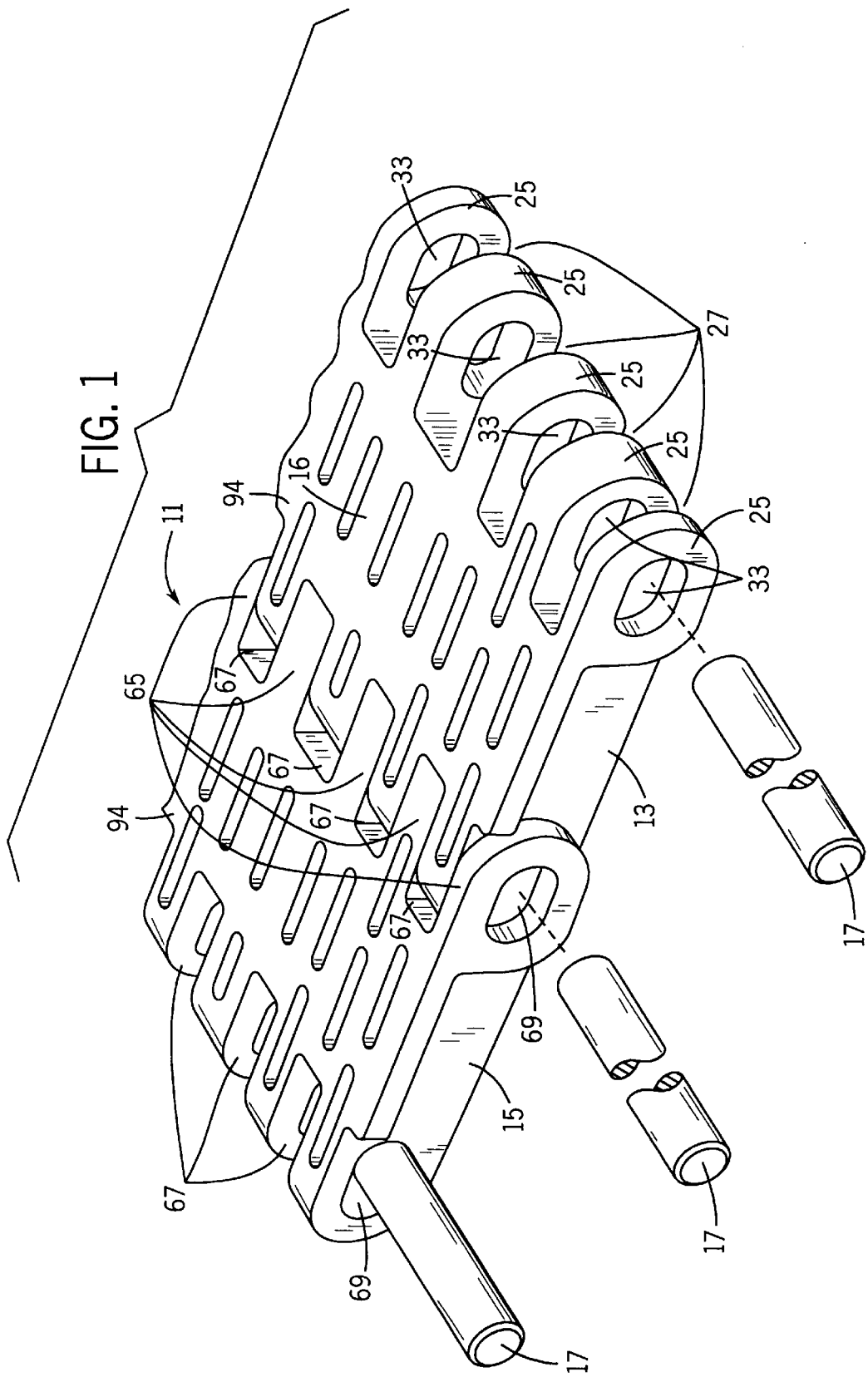

THERMOPLASTIC CHAIN LINK FOR A MODULAR CONVEYOR CHAIN

BACKGROUND OF THE INVENTION

This invention relates to a modular conveyor chain, and more particularly to an improved chain link for use in constructing a modular conveyor chain.

Manufacturing and production facilities utilize modular conveyor chains to transport products or articles of production from one location to another. Conventional modular conveyor chains are typically comprised of multiple widths of thermoplastic chain links or modules. The links making up the modular conveyor chain typically each have a plurality of spaced link ends which intermesh with complementary spaced link ends projecting from an adjacent link or links. The individual chain links are typically similar in width and may be arranged in a bricked configuration. The intermeshing link ends are joined or hinged together by a connecting pin that permits the chain links to pivot with respect to each other. The chain links are joined together to form an endless conveyor chain that is typically driven by a drive sprocket.

In use modular chains are commonly subjected to tensile forces that tend to separate the individual chain links when the chain is placed under a tensile load. Tensile forces on the modular chain are transmitted from the chain link ends to the connecting pin and from the connecting pin to the link ends of the next link.

Conventional modular chain links are typically made of thermoplastic (e.g., acetyl, polyester, nylon and polypropylene). Chain links molded from plastic are much lighter than conventional metal links. The plastic chain links also include lower friction surfaces that engage the drive sprocket and the wear strips supporting the conveyor during operation of the conveyor. These lower friction surfaces reduce the amount of friction force that is exerted on the chain links. Lowering the friction force exerted on the conveyor reduces the tension on the chain links and minimizes chain link stretching.

The choice of the thermoplastic used for the chain link usually depends on the mechanical properties which are desired (i.e., tensile strength, low-friction, chemical resistance and/or suitability for use under extreme cyclic temperatures). The strength of the modular chain link is especially important because chain links with increased mechanical properties increase the tensile strength of the modular conveyor chain and reduces the stretching that may result due to loading.

Modular conveyor chains are often used to carry goods from one location to another location where the temperature of the environment at the two locations is significantly different. The individual chain links expand as the temperature of the chain increases, and contract as the temperature of the chain decreases. As the individual chain links expand or contract the overall length of the conveyor chain varies significantly as a result of a high co-efficient of thermal expansion that is typically associated with thermoplastics.

Chain expansion due to transporting goods into a high temperature environment can be especially problematic because the interaction between the chain and the drive sprocket can be compromised. As the operating temperature of the individual chain links increases, the overall tensile strength of the conveyor chain may be reduced because thermoplastic chain links typically lose tensile strength at elevated temperatures. The Modulus of Elasticity also decreases for most plastics at elevated temperatures such that plastic chain links stretch when they are placed under tension in a high temperature operating environment.

There are also problems associated with using modular conveyor chains to transport items into a low temperature environment (e.g., in a freezer). The individual chain links contract as they enter the low temperature environment. This contraction negatively effects the interaction between the chain and drive sprocket. The conveyor chain tends to bind on the sprocket leading to wear and compromising the useful life of the modular conveyor chain.

Modular conveyor chains are also used in applications where endless conveyor chains are stacked one on top of another. One typical example is in a pasteurizer in a brewery. The modular conveyor chains are used to transport large numbers of bottles or cans through a pasteurizer. The length of the modular conveyor chains in these multi-deck systems increases significantly as the chain travels through the high temperature environment in the pasteurizer. As the chain length increases, the bottom catenary section of an upper conveyor sags and may interfere with products positioned on a lower conveyor.

Additional metal links are often used in conjunction with the thermoplastic chain links. In this type of configuration a pattern of metal links is formed throughout the modular conveyor chain. This combination of thermoplastic links and metal links results in loads on the conveyor being carried primarily by the metal links. One of the problems associated with combining links made from two different materials in order to form a modular conveyor chain is that there are significant bending stresses generated within the thermoplastic chain links due to the differences in the coefficient of friction and coefficient of thermal expansion between the thermoplastic chain links and the metal chain links.

Some conventional conveyor chains that include thermoplastic chain links are disclosed in U.S. Pat. Nos. 5,586,644, 5,575,937, 5,137,144, 4,893,709, 4,711,346, 4,698,504, 4,490,970, and 4,383,818.

SUMMARY OF THE INVENTION

The present invention is an improved chain link and modular conveyor chain. The chain link includes a body having a plurality of spaced link ends extending from opposite sides of the body. The link ends are adapted to intermesh with complementary spaced link ends projecting from a link or links in an adjacent row. The link ends include openings which are axially aligned and adapted to receive a connecting pin that runs through the openings to pivotally connect the link with an adjacent chain link or links. The chain link also includes a rigid support member that is molded within the thermoplastic body of the chain link. The support member alleviates the effect of a tensile load on the chain link when the modular conveyor chain is driven by a drive sprocket. In addition, the support member minimizes the expansion or contraction that takes place within the chain link when the conveyor chain is exposed to a significant temperature change.

The rigid support preferably includes holes that are axially aligned with the openings in the link ends of the link body. The connecting pins extend through the holes in the rigid support member when they are used to fasten adjacent links together.

An object of this invention is to provide a chain link for use in constructing a modular conveyor chain that has a low friction surface, high strength and minimal thermal expansion. Increasing the strength of thermoplastic modular conveyor chains is critical because many applications require a high strength conveyor chain.

Another object of this invention is to provide a chain link for use in constructing a modular conveyor chain that has increased strength over a range of operating temperatures. Increasing the useful range of operating temperatures where a modular conveyor chain can function effectively allows the chain to be used in a greater number of applications.

A further object of the invention is to provide a chain link for use in constructing a modular conveyor chain that is more effective in the types of applications where modular conveyor chains are typically used. Modular conveyor chains are typically used in pasteurizers, bottle and can warmers, industrial microwave ovens, shrink wrap tunnels and freezers.

Yet another object of the invention is to provide a modular conveyor chain which will resist stretching due to mechanical loading in a variety of environmental conditions including high temperatures and corrosive environments.

Other features and advantages of the invention will become apparent to those skilled in the art upon review of the following detailed description, claims and drawings.

BRIEF DESCRIPTION OF THE DRAWINGS

FIG. 1 is a partially exploded perspective view of a portion of a modular conveyor chain.

DETAILED DESCRIPTION OF THE DRAWINGS

Figure 5:
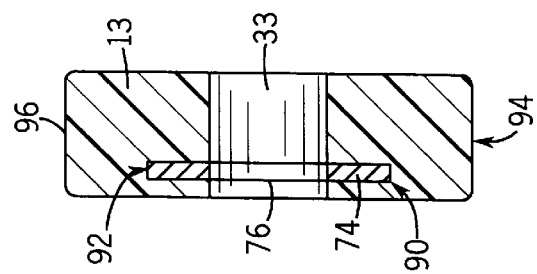
FIG. 5 is a cross-section view taken along line 5—5 in FIG. 3.

Conventional modular conveyor chain includes several rows of thermoplastic modular chain links. A portion of a typical modular conveyor chain 11 is shown in FIG. 1. A modular chain link 13 comprising the present invention is shown intermeshed with a substantially identical adjacent chain link 15. A connector pin 17 pivotally connects the chain link 13 with the adjacent chain link 15.

The chain link 13 typically comprises a link body 16 that includes a series of link ends 25 extending from opposite sides of the link body 16. The link ends 25 are transversely spaced from each other to define therebetween a series of spaces 27. The series of link ends 25 include openings 33 that are axially aligned with respect to each other. The openings 33 in the link ends 25 can be cylindrical or elongated in the direction of travel of the modular conveyor belt.

The adjacent chain link 15 is preferably the same shape as the chain link 13. The adjacent chain link 15 also includes a series of link ends 65 that are axially spaced from each other to define a series of spaces 67. The series of spaces 67 are adapted to receive the series of link ends 25 located on one side of the chain link 13. The link ends 65 extend into the spaces between the link ends 25 of the chain link 13. The link ends 65 in the adjacent link 15 also include openings 69 that are axially aligned with respect to each other as well as the openings 33 in chain link 13 when the adjacent link 15 is assembled to the chain link 13. The openings 69 may be cylindrical or elongated in the travel direction of the modular conveyor chain.

The shape of the modular chain links can take any conventional form. A conventional link shape is shown FIGS. 1 and 2. Other typical chain link configurations are described and illustrated in U.S. Pat. Nos. 5,335,768 and 5,215,185, both of which are assigned to the assignee of the present invention.

As shown most clearly in FIGS. 2–5, the chain link 13 of the present invention includes a support member 74 that is integrally molded into the body of the chain link 13. The support member 74 may have a variety of configurations, but preferably extends through the chain link from a link end 80 located on one side of the chain link 13 to a link end 82 located on an opposite side of the chain link 13 (See FIG. 3). Even more preferably the support member 74 extends through the chain link 13 in predominantly the same direction as the direction of travel of the modular conveyor chain. The direction of travel of the chain is denoted as X in FIG. 2.

One of the most important factors in determining the shape of the support member 74 is the shape of the conveyor link 13 that the support member 74 is molded within. As shown most clearly in FIGS. 4 and 5, the support member is preferably a thin strip having a top edge 90 and a bottom edge 92. The thin strip is preferably oriented such that the top edge 90 is located near a top surface 94 of the chain link 13 and the bottom edge 92 is located near a bottom surface 96 on the chain link 13.

Figures 3, 4:
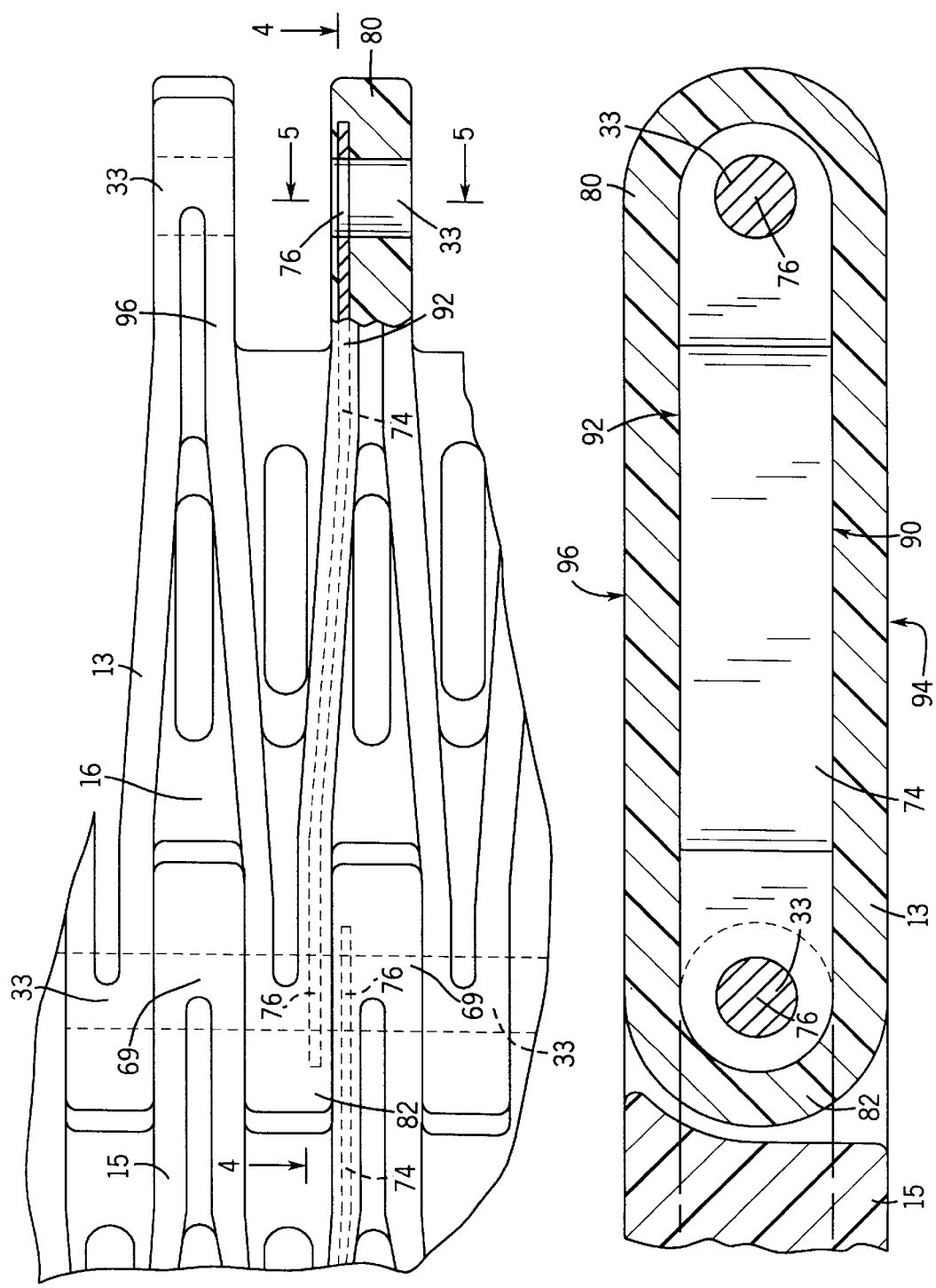
FIG. 3 is a magnified bottom plan view of the modular conveyor chain of FIG. 2.
FIG. 4 is a cross-section view taken along line 4—4 in FIG. 3.

As shown most clearly in FIG. 3, the support member 74 may include one or more bends. The bends may be necessary because the link end 80 is typically laterally offset from the corresponding link end 82 which is on the opposite side of the chain link 13.

In one preferred embodiment of the present invention the support member 74 includes holes 76, which are axially aligned with the openings 33 in the link ends. The pin 17 which connects the adjacent links extends through the holes 76 in the support member 74 and the openings 33 in the link ends.

The support member 74 may be only partially encased within the link body, but is preferably completely encased within the link body of the chain link 13 (See FIG. 4). Keeping the support member 74 encased within the chain link 13 prevents the support member 74 from engaging, and possibly damaging, products on the conveyor chain in addition to the drive sprocket that maneuvers the modular conveyor chain.

The support member 74 may also have a rough surface texture. The rough surface texture on the support member 74 facilitates the transfer of forces between the body of the chain link 13 and the support member 74.

Figure 2:
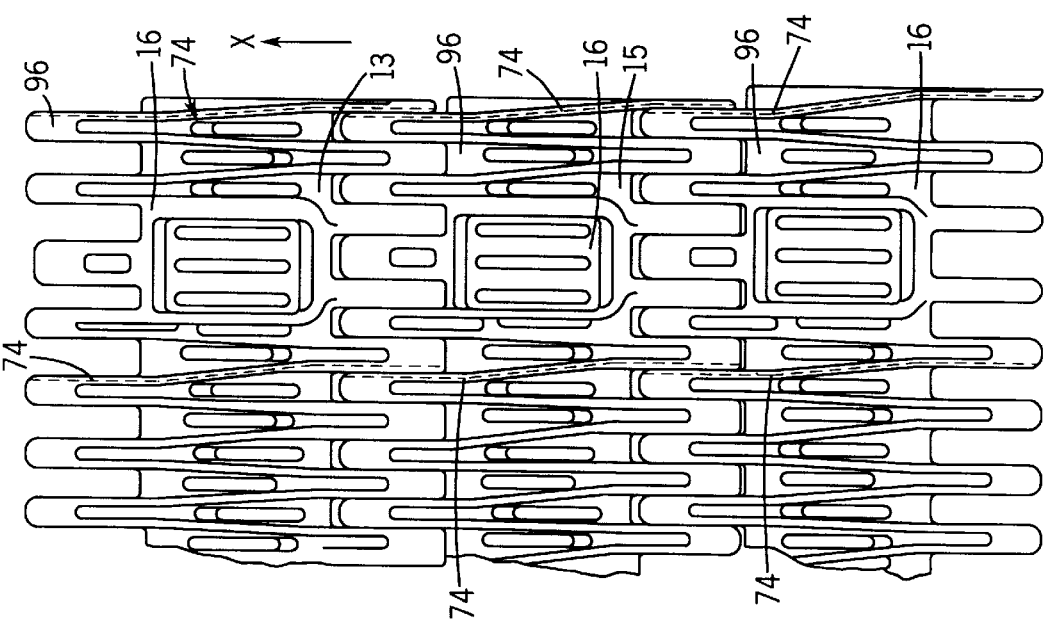
FIG. 2 is a bottom plan view of a portion of the modular conveyor chain of FIG. 1 utilizing a chain link of the present invention.

As shown in FIG. 2, each conveyor link 13 may include more than one support member 74. Using additional support members adds tensile strength to the chain links and provides further resistance to thermal expansion or contraction. The additional support members 74 are particularly effective when they extend between the link ends in the direction of chain travel.

In one preferred form of the invention the chain link is preferably molded from acetal. The support member 74 is preferably fabricated from a metal (e.g., carbon or stainless steel), or some other material having a suitable tensile strength such as a filament wound epoxy. In other arrangements the chain link could be molded from polypropylene or other moldable polymer materials used for molding chain links.

The present invention is not limited to the embodiments shown and described above, alternate embodiments will be apparent to those skilled in the art and are within the intended scope of the present invention. In particular, it will be apparent to one skilled in the art to provide support members and chain links of different configurations. Therefore, the invention should be limited only by the following claims.

What is claimed is:

1. A modular chain link for use in constructing a modular conveyor chain, said chain link comprising:

a plastic body having a plurality of spaced link ends projecting from opposite sides of said plastic body, said plurality of spaced link ends being adapted to intermesh on each of said sides with adjacent links, said link ends include substantially axially aligned openings adapted to receive a connecting pin for pivotally joining the chain link together with the adjacent links; and a support member having a first edge and an opposing second edge joined to said first edge by sides, and molded into said plastic, said support member extending through said plastic body between said link ends, wherein said edges are narrower than said sides, and said edges are aligned substantially perpendicular to a top surface of said plastic body.

2. The modular chain link of claim 1, wherein said support member is completely encased within said plastic body.

3. The modular chain link of claim 1, wherein said support member is metallic.

4. The modular chain link of claim 1 further comprising at least one additional support member molded within said plastic body.

5. The modular chain link of claim 1, wherein said support member includes at least one bend to allow the support member to extend from a first one of said link ends to a second one of said link ends which is laterally offset from said first one of said link ends on said opposite side of said plastic body.

6. The chain link of claim 1, wherein said support member includes a hole substantially axially aligned with said openings in said link ends on one side of said plastic body.

7. The chain link of claim 1, wherein said support member includes a first hole that is substantially axially aligned with said openings in said link ends on one of said sides of said plastic body and a second hole that is substantially axially aligned with said openings in said link ends on said opposite side of said plastic body.

8. The chain link of claim 1, wherein said support member has a rough surface texture.

9. The chain link of claim 1, wherein said support member is a filament wound epoxy.

10. The modular chain link of claim 1, wherein said support member is a thin strip, and said first edge is a top edge and said second edge is a bottom edge.

11. The modular chain link of claim 10, wherein said top edge of said support member is near said top surface of said plastic body, and said bottom edge of said support member is near a bottom surface of said plastic body.

* * * * *

UNITED STATES PATENT AND TRADEMARK OFFICE
CERTIFICATE OF CORRECTION

PATENT NO. : 6,161,685
DATED : December 19, 2000
INVENTOR(S) : James C. Stebnicki It is certified that error appears in the above-identified patent and that said Letters Patent is hereby corrected as shown below:

Column 5,
Line 21, after "said" [edges] should be -- sides --.

Signed and Sealed this

Sixteenth Day of April, 2002

Attest:

JAMES E. ROGAN
Director of the United States Patent and Trademark Office

Attesting Officer